No. 677,150. Patented June 25, 1901.
A. ZIMMERMAN.
COMBINED SCRAPER AND PICK.
(Application filed June 16, 1900.)
(No Model.)
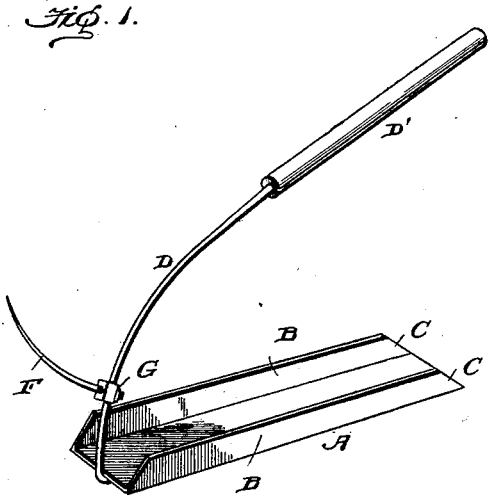
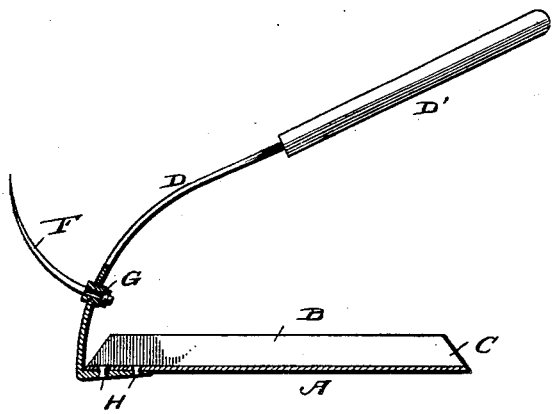

UNITED STATES PATENT OFFICE.

ADAM ZIMMERMAN, OF GETTYSBURG, OHIO.

COMBINED SCRAPER AND PICK.

SPECIFICATION forming part of Letters Patent No. 677,150, dated June 25, 1901.

Application filed June 16, 1900. Serial No. 20,521. (No model.)

*To all whom it may concern:*

Be it known that I, ADAM ZIMMERMAN, a citizen of the United States, residing at Gettysburg, in the county of Darke and State of Ohio, have invented certain new and useful Improvements in a Combined Scraper and Pick, of which the following is a specification, reference being had therein to the accompanying drawings.

My invention relates to improvements in a combined scraper or shovel and pick; and the object of my invention is the provision of a device of this character which will be simple, inexpensive, durable, and practical for the intended purpose.

To attain the desired object, my invention consists of a combined scraper or shovel and pick embodying novel features of construction and combination of parts, substantially as disclosed herein.

Figure 1 represents a perspective view of my combined scraper and pick, and Fig. 2 represents a central sectional view thereof.

My novel implement is of very simple construction and consists of the scraper or shovel, composed of the flat long bottom portion A, having the side walls B, which at the outer end are formed with the inclined edges C, which gives a cutting portion at the mouth or entrance to the scoop, scraper, or shovel, and to the inner end of the scoop is secured the lower end of the handle D, which is curved with reference to the body and is provided with the grasping portion D', and the handle near its lower portion is provided with the pick F, which extends in an opposite direction to the shovel or scoop. By this construction it is evident that I may use either the shovel or scraper or the pick, and the arrangement of the shovel and scoop is such that the balance is right and permits using the tool without fatigue.

The implement is useful for farmers, railroad-laborers, and, in fact, may be used in any situation where such an implement would be used.

The pick may be integral with the handle or may be detachable by means of the fastening G, and the handle may be integral with the scoop or shovel or may be detachable by using the fastening H. This construction also permits the use of other implements with the handle, as is evident. It will be seen that the shank or stem has an enlargement or reinforcing portion where the threaded end of the pick passes through and also that the pick can be turned in different positions and secured at any adjustment by the binding-nut, which enables the pick to be used in various places and for different purposes, as desired.

I claim—

The combined pick and scraper herein shown and described, consisting of the grasping portion or handle, the inward-curved shank or stem having the enlargement and right-angled end, the long flat horizontal scoop secured to the right-angled end and having the vertical sides or wings and the forward cutting edge, the upward-curved pick secured to the enlargement on the shank, and the nut secured to the threaded end of the pick for holding the pick and allowing the position of the pick to be changed when desired.

In testimony whereof I affix my signature in presence of two witnesses.

ADAM ZIMMERMAN.

Witnesses:
S. H. KEEFAUVER,
JACOB PEIFFER.